US005721828A

United States Patent [19]
Frisch

[11] Patent Number: 5,721,828
[45] Date of Patent: Feb. 24, 1998

[54] MULTICOMPUTER MEMORY ACCESS ARCHITECTURE

[75] Inventor: Robert Charles Frisch, Westford, Mass.

[73] Assignee: Mercury Computer Systems, Inc., Chelmsford, Mass.

[21] Appl. No.: 740,996

[22] Filed: Nov. 5, 1996

Related U.S. Application Data

[63] Continuation of Ser. No. 58,485, May 6, 1993, Pat. No. 5,598,568.
[51] Int. Cl.$^6$ .................................................. G06F 13/00
[52] U.S. Cl. .................. 395/200.47; 395/200.68; 395/200.46
[58] Field of Search .................. 379/258, 268, 379/290, 291, 337, 335; 395/200.68, 200.46, 200.47, 200.48, 200.44, 200.62, 401, 479, 478, 412, 421.08, 853, 858; 370/351, 355–360, 389, 409

[56] References Cited

U.S. PATENT DOCUMENTS

| | | | |
|---|---|---|---|
| 5,412,791 | 5/1995 | Martin et al. | 395/425 |
| 5,555,244 | 9/1996 | Gupta et al. | 370/60.1 |
| 5,577,204 | 11/1996 | Brewer et al. | 395/200.01 |
| 5,598,568 | 1/1997 | Frisch | 395/800 |

*Primary Examiner*—Mehmet B. Geckil
*Attorney, Agent, or Firm*—Choate, Hall & Stewart

[57] ABSTRACT

A multicomputer is shown made up of a crossbar network to which are connected processing nodes and I/O interface nodes. The processing nodes include crossbar interface circuits that provide routing signals in local registers so that a local processor can access memory in remote processing nodes. The crossbars include circuits to establish communication paths through the crossbar networks in response to the routing signals, so that a local processor has direct access to remote memory, which is mapped into local address space. The routing signal can have a broadcast mode and can establish priority for the signal. Under some circumstances the crossbar circuit can choose between alternative paths through a crossbar. Arbitrary sized and shaped networks of crossbars can be readily implemented, and the direct memory burst transactions allow very high speed performance.

11 Claims, 2 Drawing Sheets

| XBAR 0 | XBAR 1 | XBAR 2 | XBAR 3 | XBAR 4 | XBAR 5 | XBAR 6 | XBAR 7 | XBAR 8 | BDCST ACCEPT | ROUTING PRIORITY | BRDCAST/ SNGL MODE |
|---|---|---|---|---|---|---|---|---|---|---|---|
| 31 | 28 | 25 | 22 | 19 | 16 | 13 | 10 | 7 | 4 | 3   2 | 1   0 |

|------ LEFT-SHIFTABLE PORTION OF REGISTER ------|

MULTICOMPUTER MEMORY ACCESS ARCHITECTURE

This application is a continuation of application Ser. No. 08/058,485, filed May 6, 1993, the teachings of which are incorporated by reference herein now U.S. Pat. No. 5,598,568.

This invention relates to multicomputer memory access architecture and particularly to multicomputer communications systems in which memory mapping provides direct communication between the processing nodes and memory located in other nodes.

BACKGROUND OF THE INVENTION

Most existing computer systems are built around a single high-speed common bus. As semiconductor technology advances, faster digital devices can be constructed. This allows the devices sharing a bus to recognize and respond to briefer, higher-frequency bus signals. Unfortunately, this improvement also makes each bus device capable of consuming a greater portion of the total bus bandwidth. Any gains obtained through process improvements can quickly be offset by adding a small number of high-speed devices to the bus.

One solution is to boost the signal bandwidth of the bus by, for example, using fiber optics as a communications channel. However, a single, large bandwidth bus introduces additional problems in handling the bus in the physical environment of the typical computer.

Another way to circumvent the bandwidth limitations of a common bus is to provide a distributed communication scheme. In this approach, the components of a system are interconnected by multiple local buses. Both the nature and number of local buses can be varied to match the communications needs of a particular system.

A hypercube-based system provides multiple paths between masters and slaves. These paths are not what one thinks of as busses. Rather they are communication links between nodes which allow traffic to communicate with the attached nodes, or to pass through the connection to more distant nodes. The traffic consists of messages which are interpreted by the slave, as against specific memory accesses such as are used on busses.

A mesh multicomputer system is similar in function to a hypercube except that it generally takes the form of a two-dimensional array with, therefore, four communication ports at each node.

A multicomputer is a type of parallel processor that consists of an ensemble of computing nodes, each of which is a relatively complete and self-sufficient computing environment. The relative self-sufficiency of multicomputer nodes differentiates multicomputers from multiprocessors.

The object of the invention is to provide, for a complex multicomputer, a scalable, high performance multicomputer communication system in which multiple, direct memory accesses can occur simultaneously. Another object is to provide for a large number of computing nodes. Still another object is to provide a high performance multicomputer with reliable standard functional modules.

SUMMARY OF THE INVENTION

The invention provides, in a multicomputer including processing nodes, each having a processor and memory, and crossbars, in which a plurality of communication paths can be established between and among the processing nodes by one or more crossbars, a memory map system by which one node can access directly the memory of another through the crossbars. Each crossbar includes a plurality of ports, each being coupled to a processing node or another crossbar, for transfer of digital signals therebetween. Each processing node includes means for generating a request for access to memory, and a crossbar interface for generating message headers with routing signals, based on the access requests, for mapping remote node memory addresses on to local node memory addresses. Each crossbar includes a logic circuit, responsive to information in the message header received at a port, for establishing a path through the crossbar for the routing signal, the cumulative paths through the crossbar network providing a path for the routing signals and also for memory access between the remote node memory and the local node.

Preferably, the processing node has means for generating a routing signal that includes a header portion having a plurality of successive routing signal segments in fixed relative positions in the header portion, each representing a respective successive crossbar port between a source and destination of the routing signal. The crossbar logic circuit can decode a routing signal segment in a fixed relative position in the header portion and modify the header portion to move the next successive routing signal segment to that fixed relative position.

Also, the crossbar logic circuit can determine the availability of alternate paths through the crossbar for the routing signal. Furthermore, the processing node can generate a routing signal header portion that includes a broadcast signal in a fixed relative position in the header, to designate a broadcast mode of communication, and the crossbar logic circuit would respond to the broadcast signal to establish multiple crossbar paths.

In addition, the processing node can generate a priority signal header portion that includes a priority signal in a fixed relative position in the header, to designate a relative priority, and the crossbar logic circuit would respond to the priority signal to establish or disestablish a path through the crossbar according to that relative priority.

DESCRIPTION OF THE DRAWINGS

Other objects, features and advantages of the invention are set out below, or will be seen as inherent in the following description of a preferred embodiment of the invention, including the drawings thereof, in which.

BRIEF DESCRIPTION OF A PREFERRED EMBODIMENTS

Figure 1:
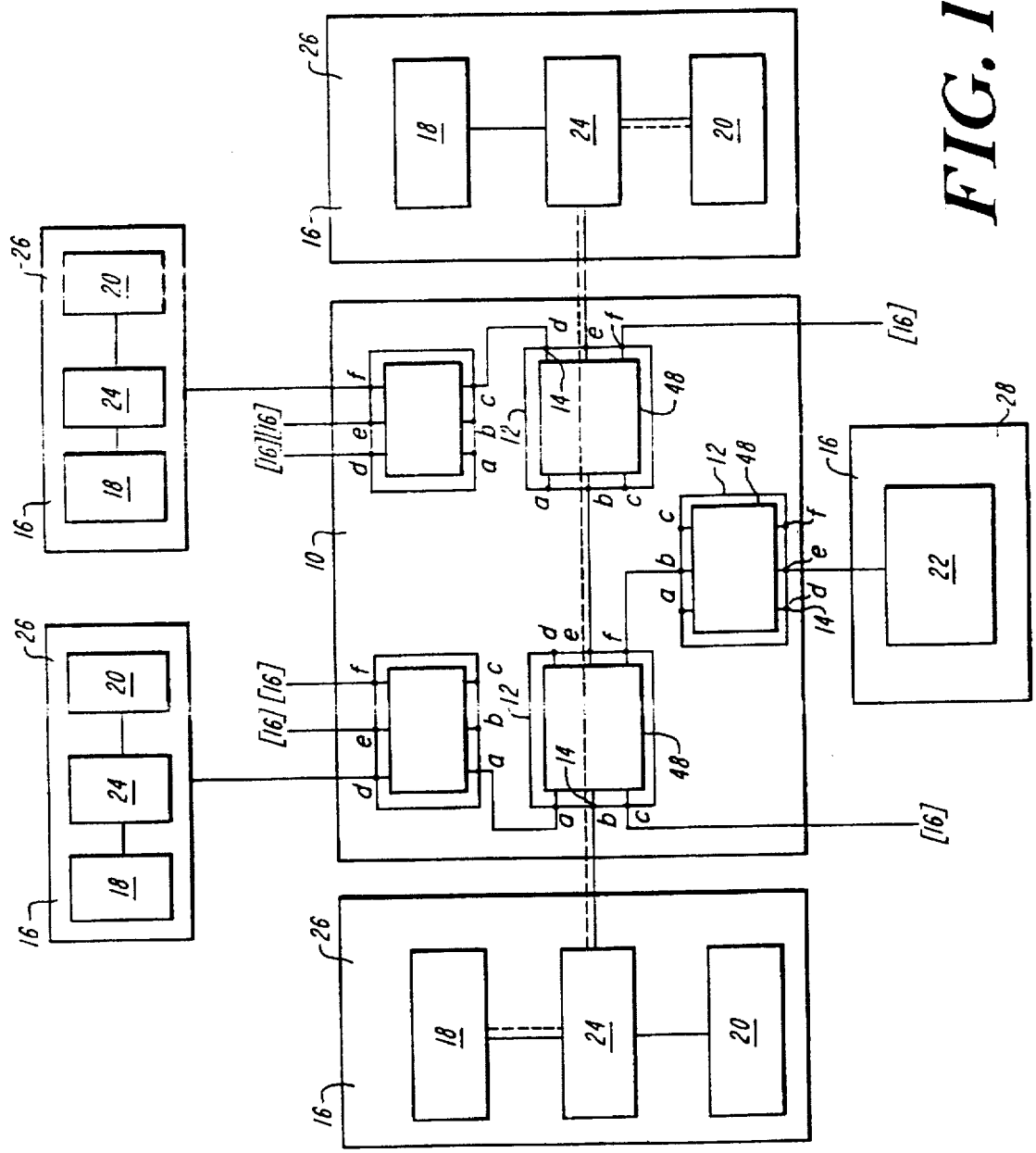
FIG. 1 is a block diagram of a multicomputer system embodying the invention.

FIG. 1 is a block diagram of a multicomputer using a communication network providing configurable architecture for multicomputing. The communication network, or crossbar network 10, is made up of a number of interconnected crossbars 12, multi-port communications devices in which one or more communication paths can be established between pairs of ports 14. Connected to the ports 14 of the crossbar network 10 are computer nodes 16, functional modules that contain some or all of the following computer resources: processors 18, memory 20, and interface (I/O) logic 22.

Based on its capabilities and its intended role in the system, a node 18 can be classified as a "processing node", an "interface node", or a "memory node".

A "processing node" 26 is intended to execute user-loadable programs. Such a node typically consists of a processor 18, its local memory 20, and other supporting hardware devices (DMA engine, timers, etc.). A processing node can also contain one or more communications interfaces. A processing node must also contain an interface 24 to the crossbar network.

An "interface node" 28 is intended to provide specific kinds of communications interfaces for use by the processing nodes. An interface node typically consists of bus-interface or I/O port logic 22. An interface node must also contain an interface to the crossbar network. The node may also contain a processor, as well as local working memory and program-storage memory. Generally, the processor in an interface node will execute I/O-related firmware, rather than user-loadable code, although there is no inherent reason why the code cannot be user loadable.

A "memory node" is intended to provide data and/or program storage for use by processing nodes and interface modes. Such a node may contain one or more kinds of memory, such as SRAM, DRAM and ROM, as well as supporting circuitry, such as refresh logic, error-checking and correction logic, or EEPROM write-circuitry. A memory node must also contain an interface to the crossbar network.

The block diagram of FIG. 1 depicts a CAM system containing several crossbars 12 and several nodes 16. It illustrates the principles of the system. Much larger systems can be built by simply enlarging the crossbar network 10 and populating its ports 14 with nodes 16.

The crossbars 12 making up the network 10 have six ports 14, a, b, c, d, e and f. The ports 14 may act as "internal" ports 14, connected to other crossbar ports 14, or as "external" ports 14, connected to nodes 16. A crossbar 12 may include both internal and external ports 14.

The crossbar network's terminal ports 14 mark a boundary 30 between the crossbar network 10 and the nodes 16. The boundary 30 is characterized by a communication protocol that is uniform across all the terminal ports 14. That is, each node 16 uses this standard protocol to send information, by means of digital signals, through the crossbar network 10. A communications path between the processor of one processing node 26 and the memory of another processing node 26 is shown in FIG. 1 as the dashed line 31. The crossbars 12 use the same protocol to send information between internal ports 14 of the network 10.

Figures 2, 3:
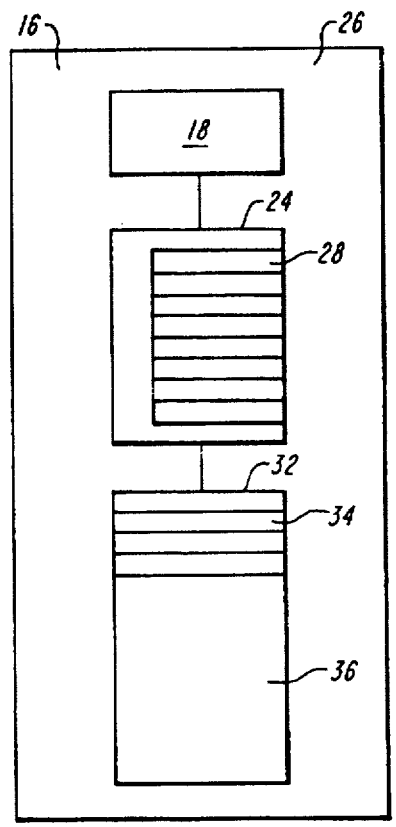
FIG. 2 is a detailed block diagram of a processing node in the multicomputer system.
FIG. 3 is a representation of a routing register in a processing node.

As seen in FIG. 2, each node 16 can be viewed as having local address-space 32 containing registers 34 and memory 36 in specific locations. The communication link, or path, through the crossbar network 10 provides a means for mapping a remote node's address space into a local node's address space, for direct access between the local node 16 and remote memory.

In the system, many sets of nodes 16 may be simultaneously executing logically-distinct transactions. In each such set of nodes 16, one "master" node initiates a transaction to which one or more "slave" nodes respond. As time progresses, the roles of master and slave may be exchanged.

Nodes 16 share use of the system's resources. However, in the system shown only one node 16 can "own" a particular resource at any given time. The node 16 that currently controls a given resource is called the "master" of that resource. Nodes 16 that contain resources accessed by a master are referred to as "slaves". Such nodes 16 temporarily relinquish control of one of the local resources (e.g., memory 20) to the master through the crossbar network 10.

A processing node 26 (or computing environment, or "CE") contains an interface 24 with the crossbar network 10, which in the preferred embodiment takes the form of logic circuitry 38 embedded in an application specific integrated circuit, or CE ASIC. This crossbar interface logic circuit 38 converts some digital signals generated by the processor 18 into digital signals for the crossbar network 10. This allows a node processor 16, for example, to access resources, such as memory, in remote nodes 16, through normal processor reads and writes. The logic circuitry 38 also acts as a path arbiter and as a data-routing switch within the processing node 26, allowing both the local processor 18 and external masters to access node resources such as memory 36 and control registers. When an external master needs to use a node's resources, the logic circuitry 38 switches access to them from the local processor 18 to the external master.

The processor 18 used in the preferred embodiment described herein is the Intel i860 processor. The logic circuitry 38 of the CE ASIC is selected to conform to the control signals generated by that processor 18. If another processor is used instead of the i860 the crossbar interface logic circuitry can be adjusted accordingly.

In particular, the crossbar interface 38 provides routing registers 40 so that a node processor 18 can, in effect, map a portion of an external slave's memory into the node's local memory. In the preferred embodiment, each processor node 26 is provided by the crossbar interface registers 40 with thirteen "external memory pages", that is, the ability to map up to thirteen segments of memory from remote slave node memories. In the preferred embodiment, for example, each external memory page is approximately 256 Mbytes long, so that a node can use up to approximately 3.25 Gbytes of remote slave address space. Each external memory page can be programmed to access a different external resource, or several pages can be programmed to access one slave's address space.

These routing registers 40 in the preferred embodiment, include two registers for each external memory page, an "external routing" register 42 and a "return routing" register 44. A routing registers may be programmed with two related pieces of information. One is a routing field which specifies a communications path through the crossbar network between the local, master, node and the remote, slave node. The other is a routing word used by a split read device to communicate back to a master. This second register is used only by split read devices.

A routing field 46 in an external routing register 42 is shown in FIG. 3. Bits 31:5 specify a communications path through up to nine successive crossbars 12. For each crossbar 12, the routing signal contains a 3-bit code which specify which port 14 of the crossbar is to be used to relay a message from the processor 18.

To communicate with resources in remote nodes, a local node programs one of its routing registers 40, and then transfers data to and from an address in the external memory page controlled by the register 40. The address in the external memory page corresponds to an address in memory of a remote node, accessed through the crossbar network 10 by way of the communication path (e.g., path 31) designated by the routing fields 46 of the routing registers 40. Once a processor 18 has programmed a routing register 40, the processor 18 can access the remote node's memory by simply reading and writing locations within the external memory page. The local processor's read or write address serves as an offset into the remote node's local address space.

Certain slaves may have a special "split-read" capability, in which the slave controls the timing of the return of read-data back to the master. For this type of slave, the master must program the "return routing" register 44 as well as the "external routing" register 42, so that a communications path back through the crossbar network 10 is designated for the slave for when it is ready to transfer data back to the master.

The information in the routing fields 46 of the routing registers 40 of the processor nodes 26 is used by the crossbars 12 to establish a communications path through the crossbar network 10. When the local processor 18 addresses one of the external memory pages, a message is directed to the crossbar network 10 which includes the routing field 46 in a message header.

That header contains "path" information which lists a series of segments in fixed relative positions corresponding to crossbar ports 14 through which the message is to be routed. Each crossbar 12 (which in the preferred embodiment is embodied in an application specific integrated circuit or ASIC) contains a crossbar logic circuit 48 that decodes the message header to establish a communications path through the crossbar 12.

As the message traverses each crossbar 12, the crossbar logic circuit alters the message header so as to "expose" the routing information for the next crossbar 12. That is, the message header has a plurality of successive routing signal segments in fixed relative positions. As the message traverses crossbars 12, the crossbar logic circuit 48 decodes a routing signal segment in a particular fixed relative position in the header (in the preferred embodiment, the three most significant bits) and modifies the header portion to move the next successive routing signal segment to that fixed relative position. The process is repeated until the communication path through the crossbar network 10 is complete. Typically, the process can be repeated up to nine times, allowing construction of crossbar networks 10 with up to nine levels of crossbars 12.

Besides establishing routes along a predetermined path, the crossbar logic circuit 48 can provide a "self-routing" crossbar mode. That is, the crossbar logic circuit 48 can route some messages to either of two ports 14. This allows the logic circuit 48 to route the message to an idle port 14 if the preferred port 14 is busy, reducing the likelihood of temporary blockage of a path.

The crossbar logic circuit 48 also accords a different priority to each of the ports 14 a, b, c, d, e, and f in the crossbar 12, in order to avoid possible deadlocks or cases in which conflicting requests block one another.

Also, the processing node 26 generates a priority signal in a fixed relative position (at bits 2:1 in the preferred embodiment) in the header, to designate a relative priority. Even after paths are established through a crossbar 12, a high-priority message can successfully acquire a port 14 presently in use by a lower-priority message. The sender of the lower-priority message is suspended by the crossbar logic circuit 48; the higher priority message is routed and sent; and then the lower priority sender's path is automatically re-established, and transmission resumes.

The header routing word of each message also contains a broadcast signal (at bit 0 in the preferred embodiment), and a "broadcast acceptance mask" in a fixed relative position (at bits 4:3 in the preferred embodiment), which the master processor 18 can program. Slave nodes compare the broadcast acceptance mask against the contents of a slave register and receive the broadcast message if the acceptance mask matches the slave register acceptance key. A master can thus use this mechanism to select different sub-populations of slaves during broadcast.

The system hand-shake protocol supports a block transfer mode in which a block of consecutive data (e.g., 2 Kbytes) may be transferred in a burst. This allows a master to acquire a path, use it intensively for a short while, and then release the path for use by other devices.

The system also allows a master to "lock" the usage of the path that it has acquired. This ensures that other port-requesters cannot acquire use of any of the current master's crossbar ports until the master has completed its block transfer and released its lock. In the preferred embodiment, assertion and deassertion of the crossbar lock occurs through execution of the i860 processor "lock" and "unlock" instructions. The crossbar logic circuit relays this "lock" signal to all of the crossbar ports that are part of the communication path. The crossbar lock allows a master to perform indivisible external-memory bus cycles, such as read-modify-write and read-maybe modify-write.

For slave devices such as serial links, which have a high data-access latency, or which transfer data slowly, the crossbar network provides a special "split-read" capability to minimize the impact of such slow devices or faster system resources. Once a path is established between a master and a slave device, the hand-shake signals allow a master to be held in a suspended state while a slave accesses read-data requested by the master. An appropriately equipped slave can suspend the master to control the pace of data transfer back to the master.

These and other features of the crossbar network are described in further detail below.

Overview

The i860 processor node 26 has:
One i860 microprocessor 18.
2, 4, 8, 16, 32 or 64 MB of DRAM with refresh and error-checking and correction (ECC) 20.
An ASIC (application specific integrated circuit) with:
  A 4 kbyte or 32 kbyte mailbox.
  Two programmable 32-bit timers and a free-running clock.
  A crossbar interface 24.
  DMA control logic.
  Interrupt control logic.

Address Space

A node's processor's overall 4-Gbyte address range is segmented into local and remote resources. A node has 2 MBytes to 256 MBytes of DRAM with error-checking and correction (ECC). DRAM is mapped into cachable and non-cachable segments; each may be as large as 256 MBytes. These segments are images of one another; their size is identical, and every cachable location has a non-cachable alias.

When non-cachable addresses space is read, data is read from DRAM, not from cache. This is true even if the i860 page-table is enabled and calls for a cached access within that address range.

The node has control registers in cachable DRAM. These registers are overlaid on non-cachable DRAM. Writing to a control-register also writes to the non-cachable alias. For example, a write to the Broadcast (B) register located at FFFF FC68 also writes to EFFF FC68. Reading a register produces the current register contents; reading the DRAM alias location returns shadow memory contents, which is determined by hardware associated with that register. Register reads are not cachable.

The node processors perform I/O operations through programmable registers and memory.

TABLE 1

| Address | Resource |
|---|---|
| Local Memory: | |
| FFFF FFFF - F000 0000 | Cachable DRAM |
| FFFF FFFF - FFFF FE00 | Cachable DRAM - 512 Bytes |
| FFFF FFFF - FFE0 0000 | Cachable DRAM - 2 MB |
| FFFF FFFF - FFC0 0000 | Cachable DRAM - 4 MB |
| FFFF FFFF - FF80 0000 | Cachable DRAM - 8 MB |
| FFFF FFFF - FF00 0000 | Cachable DRAM - 16 MB |
| FFFF FFFF - FE00 0000 | Cachable DRAM - 32 MB |
| FFFF FFFF - FC00 0000 | Cachable DRAM - 64 MB |
| FFFF FFFF - F800 0000 | Cachable DRAM - 128 MB |
| FFFF FFFF - F000 0000 | Cachable DRAM - 256 MB |
| FFFF FDFF - FFFF FC00 | Control Registers - 512 Bytes |
| FFFF FDFF - FFFF FD00 | I/O Mapping Registers |
| FFFF FDFF - FFFF FDE0 | Reserved |
| FFFF FDDC | Return Routing Register - Page 13 |
| FFFF FDD4 | External Routing Register - Page 13 |
| FFFF FDCC | Return Routing Register - Page 12 |
| FFFF FDC4 | External Routing Register - Page 12 |
| FFFF FDBC | Return Routing Register - Page 11 |
| FFFF FCE0 | Clear DMA Interrupt Register (CDI) |
| FFFF FCD8 | Reserved |
| FFFF FCD0 | Clear Debug Interrupt Register (CDBI) |
| FFFF FCC8 | Clear Local-Bus Error Interrupt Register (CLEI) |
| FFFF FCC0 | Clear Uncorrectable ECC Error Interrupt Register CUEI) |
| FFFF FCB8 | Clear Correctable ECC Error Interrupt Register (CCEI) |
| FFFF FCB0 | Clear Remote Bus Error Interrupt Register (CREI) |
| FFFF FCA8 | Clear IACK Interrupt Register (CII) |
| FFFF FCA0 | DMA Xfer Count Register (DMABC) |
| FFFF FC98 | DMA Command Pointer Register (DMACPT) |
| FFFF FC90 | DMA Next-Descriptor Register (DND) |
| FFFF FC88 | DMA Local Address Register (DLA) |
| FFFF FC80 | Mailbox Counter Register(MC) |
| FFFF FC68 | Broadcast Register (B) |
| FFFF FC60 | Time-Stamp Register (TS) |
| FFFF FC58 | Timer-2 Counter Load Register (T2CL) |

TABLE 1-continued

| Address | Resource |
|---|---|
| FFFF FC50 | Timer-2 Interval Register (T2I) |
| FFFF FC48 | Timer-1 Counter Load Register (T1CL) |
| FFFF FC40 | Timer-1 Interval Register (T1I) |
| FFFF FC38 | Performance Monitor Counter Register (PMC) |
| FFFF FC30 | Performance Monitor Mode Register (PMM) |
| FFFF FC28 | Reserved |
| FFFF FC20 | Interrupt Control Register (IC) |
| FFFF FC18 | Reserved |
| FFFF FC10 | Node Configuration Register (NC) |
| FFFF FC08 | Debug Interrupt Register (DBI) |
| FFFF FC00 | Mailbox Write Register (MW) |
| FFFF FBFF - FFFF 8000 | Cachable DRAM - 31 Kbytes |
| FFFF 7FFF - FFFF 7000 | Mailbox - 4Kbytes |
| FFFF 7FFF - FFFF 0000 | Mailbox - 32 Kbytes |
| EFFF FFFF - E000 0000 | Uncachable DRAM |
| EFFF FFFF - EFE0 0000 | 2 MB |
| EFFF FFFF - EFC0 0000 | 4 MB |
| EFFF FFFF - EF80 0000 | 8 MB |
| EFFF FFFF - EF00 0000 | 16 MB |
| EFFF FFFF - EE00 0000 | 32 MB |
| EFFF FFFF - EC00 0000 | 64 MB |
| EFFF FFFF - E800 0000 | 128 MB |
| EFFF FFFF - E000 0000 | 256 MB |
| External Memory: | |
| DFFF FFFF - D000 0000 | External DRAM - Page 13 - 256 MB |
| CFFF FFFF - C000 0000 | External DRAM - Page 12 - 256 MB |
| BFFF FFFF - B000 0000 | External DRAM - Page 11 - 256 MB |
| AFFF FFFF - A000 0000 | External DRAM - Page 10 - 256 MB |
| 9FFF FFFF - 9000 0000 | External DRAM - Page 9 - 256 MB |
| 8FFF FFFF - 8000 000 | External DRAM - Page 8 - 256 MB |
| 7FFF FFFF - 7000 0000 | External DRAM - Page 7 - 256 MB |
| 6FFF FFFF - 6000 0000 | External DRAM - Page 6 - 256 MB |
| 5FFF FFFF - 5000 0000 | External DRAM - Page 5 - 256 MB |
| 4FFF FFFF - 4000 0000 | External DRAM - Page 4 - 256 MB |
| 3FFF FFFF - 3000 0000 | External DRAM - Page 3 - 256 MB |
| 2FFF FFFF - 2000 0000 | External DRAM - Page 2 - 256 MB |
| 1FFF FFFF - 1000 0000 | External DRAM - Page 1 - 256 MB |
| 0FFF FFFF - 0000 0000 | External DRAM - Page 0 - 256 MB - DMA |

Node Registers

Each processor node has a set of 32-bit control registers. Writing to a node register also writes to local non-cachable DRAM. In general, reading from a cachable-DRAM register address yields a different value than does reading from the aliased non-cachable DRAM location. (Note that accesses to the node registers actually use uncached reads and writes, even though these addresses exist within the cachable DRAM address range).

Each of the following 54 registers has a specific purpose:

| Interrupt Registers | Timer Registers |
|---|---|
| Clear IACK Interrupt (CII) | Performance Monitor Counter (PMC) |
| Clear Remote-Bus Error Interrupt (CREI) | Performance Monitor Mode (PMM) Clear |
| Correctable ECC Error Interrupt (CCEI) | Timer-1 Interval (T1I) Clear |
| Uncorrectable ECC Error Interrupt (CUEI) | Timer-1 Counter-Load (T1CL) Clear |
| Local-Bus Error Interrupt (CLEI) | Timer-2 Interval (T2I) |
| Clear Debug Interrupt (CDBI) | Timer-2 Counter-Load (T2CL) |
| Clear DMA Interrupt (CDI) | Time-Stamp (TS) |
| Clear Mailbox Interrupt (CMI) | Broadcast (BCAST) |
| Clear Timer-1 Interrupt (CT1I) | |
| Clear Timer-2 Interrupt (CT2I) | |
| Debug Interrupt (DI) | |
| DMA Registers | Mailbox Registers |
| DMA Word-Count (DWC) | Mailbox Counter(MC) |
| DMA Local Address (DLA) | Mailbox Write (MW) |
| DMA Next-Descriptor/Start (DND) | |
| DMA Remote Address (DRA) | |
| DMA Block Count (DBC) | |
| Routing Registers | |
| Return-Routing (RR) registers for DRAM pages 0 through 13 External-Routing (ER) registers for DRAM pages 0 through 13 | |

These registers are described in the related sections of this document. For example, the mailbox registers are described in "Mailbox Message Area"

The following two registers contain distinct control and status fields:

Interrupt Control (IC).

Node Configuration (NC).

As its name implies the IC register contains interrupt control functions. The NC register contains control bits for a number of different functions. Upcoming sections describe these registers. The node registers are mapped as follows:

| Location | Register | Local Access | Remote Access | Notes |
|---|---|---|---|---|
| FFFF FC00 | Mailbox Write (MW) - | | W | 0 |
| FFF FC08 | Debug Interrupt Register (DBI) | W | W | 1 |
| FFF FC10 | Node Configuration (NC) | R/W | R/W | |
| FFF FC20 | Interrupt Control Register (IC) | R/W | R | |
| FFF FC30 | Performance Monitor Mode (PMM) | W | W | |
| FFF FC38 | Performance Monitor Counter (PMC) | R | R | |
| FFFFC40 | Timer-1 Interval (T1I) | R/W | R/ | |
| FFFF FC48 | Timer-1 Counter Load (T1CL) | R/W | R/W | |
| FFFF FC50 | Timer-2 Interval (T2I) R/W | R/W | | |
| FFFF FC58 | Timer-2 Counter Load (T2CL) | R/W | R/W | |
| FFFF FC60 | Time-Stamp (TS) | R/W | R/W | 2 |
| FFFF FC68 | Broadcast (B) | R/W | R/W | |
| FFFF FC70 | Mailbox Counter(MC) | R/W | R/W | 3 |
| FFFF FC80 | DMA Word-Count (DWC) | R | R | 4 |
| FFFF FC88 | DMA Local Address (DLA) | R | R | 4 |
| FFFF FC90 | DMA Next-Descriptor (DND) | R/W | R/W | |
| FFFF FC9C | DMA Remote Address (DRA) | R/W | R | 4 |
| FFFF FCA0 | DMA Block Count (DBC) | R/W | R | 5 |
| FFFF FCA8 | Clear IACK Interrupt (CII) | R/W | W | 6 |
| FFFF FCB0 | Clear Remote-Bus Error Int (CREI) | R/W | W | 6 |
| FFFF FCB8 | Clear Correctable ECC Error Int (CCEI) | R/W | W | 6 |
| FFFF FCC0 | Clear Uncorrectable ECC Error Int (CUEI) | R/W | W | 6 |
| FFFF FCC8 | Clear Local-Bus Error-Interrupt (CLEI) | R/W | W | 6 |
| FFFF FCD0 | Clear Debug Interrupt (CDBI) | R/W | W | 6 |
| FFFF FCD8 | (Reserved) | | | |
| FFFF FCE0 | Clear DMA Interrupt (CDI) | R/W | W | 6 |
| FFFF FCE8 | Clear Mailbox-Interrupt (CMI) | R/W | W | 6 |
| FFFF FCF0 | Clear Timer-1 Interrupt (CT1I) | R/W | W | 6 |
| FFFF FCF8 | Clear Timer-2 Interrupt (CT2I) | R/W | W | 6 |

-continued

| Location | Register | Local Access | Remote Access | Notes |
|---|---|---|---|---|
| FFFF FD04 | EM Page 0 External-Routing | R/W | R/W | |
| FFFF FD0C | EM Page 0 Return-Routing | R/W | R/W | |
| FFFF FD14 | EM Page 1 External-Routing | R/W | R/W | |
| FFFF FD1C | EM Page 1 Return-Routing | R/W | R/W | |
| FFFF FD24 | EM Page 2 External-Routing | R/W | R/W | |
| FFFF FD2C | EM Page 2 Return-Routing | R/W | R/W | |
| FFFF FD34 | EM Page 3 External-Routing | R/W | R/W | |
| FFFF FD3C | EM Page 3 Return-Routing | R/W | R/W | |
| FFFF FD44 | EM Page 4 External-Routing | R/W | R/W | |
| FFFF FD4C | EM Page 4 Return-Routing | R/W | R/W | |
| FFFF FD54 | EM Page 5 External-Routing | R/W | R/W | |
| FFFF FD5C | EM Page 5 Return-Routing | R/W | R/W | |
| FFFF FD64 | EM Page 6 External-Routing | R/W | R/W | |
| FFFF FD6C | EM Page 6 Return-Routing | R/W | R/W | |
| FFFF FD74 | EM Page 7 External-Routing | R/W | R/W | |
| FFFF FD7C | EM Page 7 Return-Routing | R/W | R/W | |
| FFFF FD84 | EM Page 8 External-Routing | R/W | R/W | |
| FFFF FD8C | EM Page 8 Return-Routing | R/W | R/W | |
| FFFF FD94 | EM Page 9 External-Routing | R/W | R/W | |
| FFFF FD9C | EM Page 9 Return-Routing | R/W | R/W | |
| FFFF FDA4 | EM Page 10 External-Routing | R/W | R/W | |
| FFFF FDAC | EM Page 10 Return-Routing | R/W | R/W | |
| FFFF FDB4 | EM Page 11 External-Routing | R/W | R/W | |
| FFFF FDBC | EM Page 11 Return-Routing | R/W | R/W | |
| FFFF FDC4 | EM Page 12 External-Routing | R/W | R/W | |
| FFFF FDCC | EM Page 12 Return-Routing | R/W | R/W | |
| FFFF FDD4 | EM Page 13 External-Routing | R/W | R/W | |
| FFFF FDDC | EM Page 13 Return-Routing | R/W | R/W | |

Notes:
0: This register provides a window through which external masters write data into slave memory.
1: This register is normally used by diagnostics. Writing to it sets an interrupt to the local processor; this is usually-non-maskable except when executing a service routine.
2: This is a free-running register which is normally read-only.
3: This register is 16 bits wide (lower 2 bytes of 32-bit register location).
4: This dynamic register is reserved for diagnostics.
5: This register is written by the DMA controller.
6: The local processor can synchronously clear this interrupt by writing to this register; asynchronous clear is done by reading this register. Only the local processor can do an asynchronous clear.

| Node Configuration (NC) Register | FFFF FC10 |
|---|---|

Each processing node has a Node Configuration (NC) register which supports various node configuration and diagnostic functions. Several of the Configuration-register fields MUST be specified immediately following power-up; these include the following:

Local DRAM configuration: bank-size, row/column select, and bank-enable.

Processor execution-state controls: run/stop and CS8/ normal instruction-fetch.

Oscillator divide-down ratio (if the timers are to be used).

Mailbox size (needed in most applications).

The Configuration register also contains control fields for a number of diagnostic features. The following diagnostic controls can be, but need not be, programmed following node power-up:

Counter diagnostics split-mode.

ECC diagnostic mode

DRAM refresh-rate diagnostic mode.

Configuration of the node DRAM is described in the section titled "Node DRAM Configuration". Selection of the node's mailbox size is described in the section titled "Setting and Reading Mailbox Size". The remaining Configuration-register configuration and diagnostic functions are described in sections below.

| Bit | Mnemonic | R/W | Definition |
| --- | --- | --- | --- |
| 31-16 | ECCS | R | ECC Syndrome |
| 15 | DRR | R/W | DRAM diagnostic refresh rate |
| 14 | CDM | R/W | Counter diagnostic mode |
| 13 | ECCE | R/W | ECC enable |
| 12 | | | Unused |
| 11 | CS8 | R/W | CS8 Mode Control |
| 10 | ODR | R/W | Oscillator divide-down ratio |
| 9 | EDM | R/W | ECC diagnostic mode |
| 8 | DBE | R/W | DRAM bank 1 enable |
| 7:5 | DBS | R/W | DRAM bank size |
| 4:2 | DRC | R/W | DRAM row/column configuration |
| 1 | MBS | R/W | Mailbox size |
| 0 | RSC | R/W | Run/stop control |

DRAM Diagnostic Refresh Rate (DRR)—Bit 15

DRR selects either normal refresh or fast refresh.

1=1× refresh (625 refreshes/8 ms, 1 refresh/12.8 us) (normal)

0=4× refresh (2500 refreshes/8 ms, 1 refresh/3.2 us) (fast)

Each node has a DRAM refresh controller that performs asynchronous refresh cycles at a rate compatible with the DRAM chips. Set for normal refresh.

Counter Diagnostic Mode (CDM)—Bit 14

CDM selects either normal counter or partitioned counter:

0=the counters operate as 32-bit counters (normal).

1=partition the counters into 4-bit counters.

A processing node has a number of counters, such as the DMA Block-Counter register. Since these are 32-bit registers it would take quite a while to exercise these counters through their full count range. Partitioning speeds up this process. In this mode, a counter increment pulse is simultaneously applied to all 4-bit segments; 16 increment pulses fully exercise the counter.

To utilize this operating mode the diagnostic code can do the following:

1) Set the "enable force-increment" NC-register bit to select diagnostic mode.

2) Diagnostics loads each register with a known value, such as 0.

3) Diagnostics hits the Force Increment location (FFFF FC78) several times.

4) Diagnostics reads back the counter, and compares the read value against the expected value. If these disagree, the counter is probably faulty.

ECC Enable (ECE)—Bit 13

ECE selects either of two ECC error-bit generation and checking modes.

0=ECC generates and checks its usual ECC codes (normal)

1=ECC uses byte parity

Using byte parity, each 8 of the 14 check-bits stores the parity of each of the 8 bytes of the (64-bitwide) data words. The error-checking circuitry then tests for correct byte-parity, rather than for a correct ECC code. This is the state of bit 13 following power-up. Byte parity only detects errors, and it is not as comprehensive as normal ECC. Clear bit 13, to enable normal ECC operation.

Oscillator Divide-Down Ratio (ODR)—Bit 10

ODR selects the clock divide ratio to generate a 10 MHz clock for the timers:

0=/4 (40 MHz CPU clock)

1=/5 (50 MHz CPU clock)

The node timer software uses a 10 MHz clock, and the processor board generates either a 40 MHz or 50 MHz clock. ODR selects the divide down ratio to generate a 10 MHz timer clock.

ECC Diagnostic Mode (EDM)—Bit 9

EDM enables or disables the ECC check bit drivers:

0=enables the ECC check-bit drivers (normal).

1=disables the ECC check bit drivers.

The check bits are enabled after power-up.

EDM can be used to test the DRAM error checking and correction ECC) circuitry. If the drivers are disabled, an ECC logic check routine can write a value to DRAM; the check bits will remain unchanged. When the check routine reads the same DRAM location, one of the ECC Error interrupts should be asserted if the ECC circuitry is operating correctly.

Note: Disabling the check bit drivers does not affect ECC checking; it only affects writing ECC check bits to memory.

DRAM Bank-Enable (DBE)—Bit 8

DBE enables and disables DRAM bank 1:

0=disable DRAM bank 1

1=enable DRAM bank 1

DBE must be programmed when the node is initialized. Each node has two DRAM banks (0 and 1). If a node has 128 MB of DRAM, only bank 0 is populated. If the node's DRAM exceeds 128 MB, bank 1 is also populated. If bank 1 is populated, set DBE to enable use of that bank. Otherwise, only bank 0 is accessible (that is, the top-most 128 MBytes or less of the cachable (or non-cachable) address space).

Note: DBE is used by address validation circuitry; if a node contains only one 128-MByte bank, a read- or write to bank-1 will cause a local-bus error.

DBE is cleared to 0 following power-up.

DRAM Bank Size (DBS)—Bits 7:5

DBS encodes the node DRAM bank size, as follows:

| NC Bits | | | |
| --- | --- | --- | --- |
| 7 | 6 | 5 | Bank Size (MB) |
| 0 | 0 | 0 | 2 |
| 0 | 1 | 0 | 8 |
| 1 | 0 | 0 | 32 |

A node's physical DRAM is populated from the top of the local address-space down. Thus, DRAM bank 0 always occupies the top of the node address range. If the optional second bank is also populated, it is located below bank 0.

DBS power-up as 000. This is 2 Mbytes. If a larger bank-size is present, the node's bank-size bits must be properly programmed before DRAM outside the 2-MByte range is accessible.

DRAM Row/Column Configuration (DRC)—Bits 4:2

DRC encodes the row- and column-address bits for a given DRAM type. When initializing the node, program DRC with the appropriate code:

| DRAM: | 1Mx16 | 256Kx16 | 4Mx16 | 1Mx4 | 16Mx4 | 8Mx8 | 4Mx4 |
|---|---|---|---|---|---|---|---|
| DRC: | 000 | X00. | 110 | XX0 | 111 | 110 | |

DRC powers-up as 000.

Mailbox Size (MBS)—Bit 1

MBS defines the size of the mailbox.

1=4 Kbytes

0=32 Kbytes.

Note: If a 4-Kbyte mailbox area is used, the unused lower 28-Kbyte portion of the mailbox address range is available for other uses.

Run/Stop Control (RSC)—Bit 0

RSC starts and stops the i860 processor as follows:

0=reset and halt the i860 processor.

1=restart the i860 processor.

An external node can reset a node, access the node's resources, then restart the node. The restart starts execution at the processor's reset-trap location (FFFF FF00).

Note: Either the node processor or an external node can program RSC. If the node processor resets and halts itself, an external master must restart it, or the motherboard must be reset. If a node processor writes a 1 to its RSC bit, normal execution continues (since the bit was already a 1 then clear and set bit 0 NC:RSC to reset the processor.

8-bit instruction fetches are used to boot, otherwise use 64- bit instruction fetches.

| Routing Registers | External Routing | FFFF FDx4 |
|---|---|---|
| | Return Routing | FFFF FDxC |

The routing registers define the data route from master to slave through the Crossbars. The external routing register defines the communication route through the crossbars. Each crossbar has 6 ports, requiring 3-bits of data to define the output port. The routing specification is 27 bits long so that an address can route through as many as 9 crossbars.

The return routing register defines the data path used by a split-read slave when sending data to the master. In all other data transfers, the master retains control of the bus until it has received the data from the slave. If a master knows that an addressed slave lacks split-read capability, the master need not program its return routing register.

The routing registers have the following bits:

| Bit | Mnemonic | R/W | Definition |
|---|---|---|---|
| 31:29 | XB0 | | Crossbar 0 |
| 28:26 | XB1 | | Crossbar 1 |
| 25:23 | XB2 | | Crossbar 2 |
| 22:20 | XB3 | | Crossbar 3 |
| 19:17 | XB4 | | Crossbar 4 |
| 16:14 | XB5 | | Crossbar 5 |
| 13:11 | XB6 | | Crossbar 6 |
| 10:8 | XB7 | | Crossbar 7 |
| 7:5 | XB8 | | Crossbar 8 |

-continued

| Bit | Mnemonic | R/W | Definition |
|---|---|---|---|
| 4:3 | BACC | | Broadcast accept |
| 2:1 | RPRI | | Routing priority |
| 0 | BMOD | | Broadcast/single mode |

Crossbar Port n (XBn)—Bits 31:5

Bits 31:5 specify a route through successive crossbar switches. For each crossbar traversed, the routing word contains a 3-bit code which selects an output port. As the message traverses each crossbar, the crossbar logic shifts the route data (bits 28:5) left 3 bits so that the next crossbar has its decode in bits 31:29. Bits 4:0 remain unchanged by the shift-left.

To create the 3-bit Crossbar routing codes, you need to know:

Where you are routing to and what path to use.

Within each crossbar on this route, you need to know:

Through which port are you exiting the Crossbar?

Are you doing a single-port or a broadcast transfer?

With this information, you can create the codes according to the following table:

| Code | Single-port | Broadcast |
|---|---|---|
| 0 | F first, auto-route* | A, B, C, D, F |
| 1 | E first, auto-route* | A, B, C, D, E |
| 2 | F | F |
| 3 | E | E |
| 4 | D | D** |
| 5 | C | C** |
| 6 | B | B** |
| 7 | A | A** |

*Auto-route is available when a crossbar switch is used in non-broadcast mode. In auto-route mode, the routing logic will first attempt to assign the selected port (say, port F) as the output through which to route the message. If arbitration for that port fails, the routing logic will attempt to route the message through the other crossbar port (i.e. port E). The attempted routing will continue to toggle between the two crossbar ports until arbitration for one of these ports succeeds.

**If a requesting port selects a routing code that matches its port ID, the crossbar routing logic interprets that code as a request to send to all other node ports (ports A through D, not to ports E and F). For example, if a master attached to port A of a crossbar requests routing with a code of 7 (which is the code for port A), then ports B, C, and D are selected. If a port-B master uses a routing code of 6, ports A, C and D are selected.

Broadcast Accept (BACC)—Bits 4:3

Routing-word bits 4:3 hold a broadcast acceptance code which is used to make the broadcast process more selective than simply sending a message to all ports at the end-point of a routing path. Each slave node contains a "broadcast" control register located at non-cachable local DRAM address FFFF FC68. Bits 11:8 of this register can be programmed with a (broadcast) "acceptance" code which is compared against the broadcast-acceptance code of any broadcast message. A slave receives and stores an incoming broadcast message ONLY if the broadcast-acceptance bits of the message match that slave's local broadcast-register acceptance code bits.

The broadcast acceptance codes are defined as follows:

| Broadcast | | Slave Broadcast Control Register (SBCR) | |
|---|---|---|---|
| Accept Code | | Use Slave | |
| Bit 4 | Bit 3 | Broadcast Offset | Receive Broadcast if |
| 0 | 0 | No | SBCR bit 8 is 1 |
| 0 | 1 | Yes | SBCR bit 9 is 1 |
| 1 | 0 | Yes | SBCR bit 10 is 1 |
| 1 | 1 | Yes | SBCR bit 11 is 1 |

Broadcast code 0 is intended for use in broadcasting a high-priority message which is to affect the same address in all recipients. (This explains why the broadcast offset register is not used to generate a local slave address for code 0; see below for further details). As an example, this broadcast acceptance code can be used to broadcast to the mailbox of each of a set of processing nodes, thus interrupting all of those node processors.

Broadcast acceptance codes 1, 2 and 3 allow each slave to control its own reception of broadcasts. In addition, these broadcast codes DO use the slave's broadcast offset register. This allows a slave to store received broadcasts in a local buffer whose base address is programmed by the slave (by loading the slave's broadcast offset register).

After powering-up, all bits in the slave broadcast control register are 0. This means that a slave node is unable to receive broadcasts until bit 8, 9, 10, or 11 of its broadcast control register is explicitly programmed to a 1.

After powering-up, initialize the routing registers before accessing external resources.

The slave processing node compares this message-header information against the contents of a slave register and receive the broadcast only if the acceptance mask matches the slave-register acceptance key. A master can use this mechanism to select sub-populations of slaves during broadcasts.

Routing Priority (RPRI)—Bits 9:1

Routing priority (RPRI) specifies the routing priority of a message through all crossbars that the message traverses. If multiple messages simultaneously present routing requests to a crossbar, the message with the highest priority wins access. The priority codes are defined as follows:

| Priority Code | | |
|---|---|---|
| Bit 2 | Bit 1 | Priority Level |
| 0 | 0 | 0 (lowest) |
| 0 | 1 | 1 |
| 1 | 0 | 2 |
| 1 | 1 | 3 (highest) |

Routing priority arbitrates Crossbar port contention when more than one master simultaneously tries to access a Crossbar port. The master with the highest routing priority is granted the crossbar path. If, while it is using the path, a higher-priority request is asserted, the path is granted to the new highest priority master, and the lesser-priority master is suspended. If the lesser-priority master is executing a locked transfer, it retains the path until finished with the locked transfer. When the highest-priority master releases the path, the path is returned to the original master.

This arbitration and the access suspensions are transparent to software

If more than one request has the same priority level, the requesters' port IDs are used, where Port F has the highest priority and port A has the lowest priority.

Broadcasts have a single priority level which applies to all paths created during the broadcast. Data is not sent to the slaves until all paths to the slaves have been acquired. Broadcasts should use a high priority level, so that a broadcast is not blocked for a long time waiting for a higher-priority nonbroadcast transfer to finish.

Broadcast/Single Mode (BMOD)—Bit 0

Bit 0 selects either single port or broadcast transfer:
0=Single port
1=Broadcast In single port mode, each three-bit code establishes a single point-to-point path through that crossbar. In broadcast mode, each Crossbar crossing branches out through one or more paths.

Routing Notes

If a master writes to an unpopulated crossbar port, the write data is lost. The master does not receive any indication that this has occurred. If a master attempts to read from an unpopulated crossbar port, the master receives a remote-bus error interrupt. The read data is undefined.

Software must ensure that each routing-path through a series of crossbars encounters an addressable end-point within 9 switches.

When a master requests a route through a crossbar, a copy of the selected external routing register is presented to the crossbar. Bits 31:29 of this copy always contain the routing code which applies to the next crossbar to be traversed. This is ensured by left-shifting bits 31:5 of the copy after bits 31:29 have been used to guide a traversal. The most-recently-used routing code is thus discarded (leftshifted out of the high 3 bits of the routing word). As this occurs, 0's are shifted into bits 7:5 of the copy of the routing word.

Accessing an External Slave

A master accesses an external slave by reading or writing the slave's page within the master's local address space. The slave receives the following address, decoded from the master's address and transfer control data.

| Bit | Mnemonic | R/W | Definition |
|---|---|---|---|
| 31:28 | PALIGN | | Page access alignment |
| 27:3 | OFFSET | | Offset passed to slave |
| 2 | | | Not used |
| 1 | READ | | Read flag |
| 0 | LOCK | | Lock flag |

PALIGN is encoded from the data width and alignment requested by the master. PALIGN is defined as follows (where B0 is bits 7:0 and B7 is bits 63:56):

| Page Access | PALIGN | | | |
|---|---|---|---|---|
| Alignment | 31 | 30 | 29 | 28 |
| B0 | 0 | 0 | 0 | 0 |
| B1 | 0 | 0 | 0 | 1 |
| B2 | 0 | 0 | 1 | 0 |
| B3 | 0 | 0 | 1 | 1 |
| B4 | 0 | 1 | 0 | 0 |
| B5 | 0 | 1 | 0 | 1 |
| B6 | 0 | 1 | 1 | 0 |
| B7 | 0 | 1 | 1 | 1 |
| B1:B0 | 1 | 0 | 0 | 0 |
| B3:B2 | 1 | 0 | 1 | 0 |
| B5:B4 | 1 | 1 | 0 | 0 |
| B7:B6 | 1 | 1 | 1 | 0 |
| B3:B0 | 1 | 0 | 0 | 1 |
| B7:B4 | 1 | 1 | 0 | 1 |
| B7:B0 | 1 | 0 | 1 | 1 |

OFFSET is copied from bits 27:3 of the address asserted by the master.

The crossbar sets READ to 1 if the master is reading, otherwise READ is cleared.

LOCK is cleared to 0 if the master is requesting a locked transfer.

Split-Read Accesses

A split-read slave can split a master's read cycle by requesting the master to issue a return route address, and then suspend its process. The slave will respond later with data to that route address. While the master is suspended, other devices may access master node resources through available Crossbar routes. The split read is transparent to software running on the master node.

While the master is suspended, the split-read slave may complete its current processing, and then send the requested data to the master using the path specified in the return-routing register. When the master receives this data, it is released from the suspended state, and resumes its normal execution.

Note: Slaves initiate split-reads; not masters, but masters must have anticipated it and stored a valid return routing word.

A master cannot perform a read-modify-write or a read-maybe-write access to a split-read slave. Instead, when a master performs a locked access to such a slave, the slave responds to the master's read-access by performing a write of all 1's to the accessed slave address. This implements a test-and set operation.

Access Errors

The following table shows local and external access errors. Local and external errors are described in greater detail following the table. For further information on ECC errors, see the section, "Error Checking and Correction (ECC)". For further information on VME errors, see the document, "The VME Interface".

| <------Event------> | <------Generated Error Signal------> | | | |
|---|---|---|---|---|
| Local | External | Local | Latch | External | Latch |
| Correctable ECC | | Corr ECC | Yes | None | No |
| Uncorrectable ECC | | Uncorr ECC | Yes | None | No |
| Non-DMA page-0 access | | Local-bus | Yes | None | No |
| R/W invalid location | | Local-bus | Yes | None | No |
| R unpop'ltd Crossbar port | | Rem-bus | No | None | No |
| W unpop'ltd Crossbar port | | None | No | None | No |
| R VME | | VME-read | No | None | No |
| W VME | | VME-write | No | None | No |
| | R/W invalid loc | Rem-bus | No | Local-bus | Yes |
| | Correctable ECC | None | No | Local-bus | Yes |
| | Uncorrectable ECC | Rem-bus | No | Local-bus | Yes |

Local-Access Errors

If a node processor, DMA controller, or an external master, attempts to access an invalid location within its local address space, the node processor receives a local-bus error interrupt. Invalid accesses include reads or writes to unpopulated DRAM or accesses to external- DRAM page 0.

The bottom 256 MBytes of DRAM (external memory page 0) is reserved for the node's DMA controller. If the processor attempts a read from this area, the read data is undefined. If the processor attempts to write to this address range, DRAM is left unaltered.

Reads of undefined control register locations (FFFF FC00-FFFF FDFF) will return the internal CE state. Writes to undefined control register locations are ignored by internal CE state, but are shadowed in DRAM.

If a local-bus error, a correctable ECC error or an uncorrectable ECC error occurs during a local read or write, the NC register captures bits 27:13 of the offending address. Bits 12:0 are not captured. This means that the address associated with the error can only be localized to within 8 Kbytes. The NC register has a flag (bit 16) which indicates that the error occurred during a local access.

Both the local-error indicator and the lower 13 bits of the offending address remain latched in NC until the local processor clears all three interrupts (correctable ECC, uncorrectable ECC and local-bus interrupts). This mechanism ensures that the Configuration register captures information relating the first of what might be several occurrences of these interrupts.

External Access Errors

If a processing-node master access an invalid slave node location, the master receives a remote-bus error interrupt. In this case, the slave node also receives a local-bus error.

Invalid types of access to otherwise-valid locations, such as write attempts to a read-only location, do not cause an error indication If a remote-bus error occurs due to any of the conditions described above, the external master assessor bit of the external node's Configuration register is set, indicating that the external node's (local) bus error was due to an access by an external node.

If the external access causes a local-bus error in the slave node, then the slave node's Configuration register captures address-bits 27:13 of the offending external master's address.

Note: The Configuration register of the node which CAUSES a remote-bus error does NOT latch either an "external master" indication or the MSBs of the offending address.

When a node's processor or its DMA controller specifies a path which attempts to route through an unpopulated crossbar port, that node receives a remote-bus error interrupt. Similarly, when a node performs a read of an external node, and that read fails (that is, the slave incurs a local-bus error or an uncorrectable ECC error), the master receives a remote-bus error. In this case, the slave also receives a (local-bus) error indication. If the read-error was caused by an uncorrectable ECC error in the slave, the master receives a copy of the erroneous (uncorrected) data.

If a master reads from a slave, and the slave incurs a correctable ECC error, the master receives no error indication. The master receives a copy of the corrected data, not of the original incorrect data. The slave receives a correctable ECC interrupt, and the offending address is captured in the slave's Configuration register.

If a node attempts to write to an external node, and that write fails, the master receives NO error indication. The slave does not receive an error indication, either.

Node Resource Arbitration

Each node arbitrates conflicts for access to that node's resources. The following devices, listed from highest priority (DMA controller) to lowest priority, share the node's resources.

The node's local DMA controller.

External masters.

The node's CE_ASIC-resident DRAM refresh controller.

The node's processor.

This arbitration is invisible to software, but it may affect code-execution timing (access latency, data transfer rates, etc.).

Interrupts

The node processor receives internal and external interrupts. The node processor can be interrupted by the following resources and conditions:

The node timers.

The node's DMA controller (to inform the processor that a DMA transfer has been completed).

ECC errors.

A mailbox message is received.

A local bus-error.

A remote bus-error (invalid read or write to external memory).

A debug interrupt (to debug interrupt service routines).

External device interrupts.

The VME interrupt-generator circuitry is available to post a new VME interrupt.

The DMA controller cannot directly respond to interrupts; the node processor receives interrupts for the DMA controller and then responds accordingly.

Interrupt Control Register (IC) FFFF FC20

The Interrupt Control Register (IC) receives interrupts.

IC has three bit-fields: enabled, pending and vector. Pending indicates whether an interrupt source is currently active. Enabled determines whether an active interrupt source actually generates an interrupt to the node processor. Vector is a code that corresponds to a particular combination of active interrupt sources. The vector dispatches a particular interrupt service routine, and selects a new set of enabled bits to be used when servicing of the interrupt. The enable bits are read/write, but the pending bits and vector bits are read only.

Each of these fields has a bit for each interrupt source as follows:

| Interrupt | Mnemonic | Int Enable R/W | Int Pending (R) | Int Vector (R) |
|---|---|---|---|---|
| VME Interrupter Free | VIF | 21 | 9 | 4 |
| Remote-Bus Error | RBE | 22 | 10 | 3 |
| Correctable ECC Error | CEE | 23 | 11 | 3 |
| Uncorrectable ECC Error | UEE | 24 | 12 | 3 |
| Local Bus Error | LBE | 25 | 13 | 3 |
| Debug Interrupt | DBE | * | 14 | 3 |
| External Interrupt | EXT | 27 | 15 | 4 |
| DMA Controller Interrupt | DMI | 28 | 16 | 5 |
| Mailbox Interrupt | MBI | 29 | 17 | 6 |
| Timer-1 Interrupt | T1I | 30 | 18 | 7 |
| Timer-2 Interrupt | T2I | 31 | 19 | 8 |

Note: All unlisted bits are unused, and read as 0.
*The debug interrupt is not maskable.

Interrupt Enable Bits

The interrupt enable bits enable and mask interrupts. Only the local node processor can write to its enable bits.

0=Masks the interrupt.

1=Enables the interrupt.

Interrupt Vector Bits

The vector bits combine related interrupt-sources, so that one interrupt service routine (ISR) can handle any of the members of a related interrupt group. Bits 10 through 14 (vector 3) a indicate exceptional conditions. Bits 9 and 15 are often used together; usually, bit 9 is used when interrupting a VME slave, while bit 15 is used to receive VME interrupts.

Pending Bits

The pending bits are set by active interrupt sources, but must be cleared by the local node processor. This is normally done while the local processor executes the associated interrupt service routine. With the exception of bit 15 (external interrupts), each pending bit has an associated interrupt clear register.

Clearing Interrupts—Synchronously and Asynchronously

Each interrupt source has an associated interrupt clearing register. Reading or writing an interrupt clear register clears the interrupt's pending bit in the IC register.

To clear interrupts, write or read the following registers:

| Interrupt Clear Register | Mnemonic | IC BIT | Address |
|---|---|---|---|
| Clear VME Interrupter FreeR | CVI | 9 | FFFF FCA8 |
| Clear Remote-Bus Error | CRBE | 10 | FFFF FCB0 |
| Clear Correctable ECC Error | CCEE | 11 | FFFF FCB8 |
| Clear Uncorrectable ECC Error | CUEE | 12 | FFFF FCC0 |
| Clear Local-Bus Error | CLBE | 13 | FFFF FCCB |
| Clear Debug Interrupt | CDBE | 14 | FFFF FCD0 |
| Clear DMA Controller Interrupt | CDMI | 16 | FFFF FCE0 |
| Clear Mailbox Interrupt | CMBI | 17 | FFFF FCE8 |
| Clear Timer-1 Interrupt | CT1I | 18 | FFFF FCF0 |
| Clear Timer-2 Interrupt | CT2I | 19 | FFFF FCF8 |

The node control registers are located in cached DRAM. Within cached DRAM, writes are buffered in the cache, while reads are not. If the read address is cached, the cache line is flushed.

These interrupts may be cleared by either reading or writing the respective interrupt clear registers. A read causes a synchronous clear that is not buffered in cache. This guarantees that a pending interrupt will be cleared (if the associated ISR is done before the current clear is completed. A write causes an asynchronous clear that flushes the associated cache line to DRAM. An asynchronous clear does not guarantee that a previously-set interrupt from that same source was cleared before the current clear; the associated interrupt-service routine may not execute for every pending interrupt from that source.

Only the local processor can do a synchronous clear.

An interrupt-service routine should synchronously clear an interrupt. However, an asynchronous clear may increase performance if software ensures that any pending interrupt is cleared before that interrupt is re-enabled.

DRAM

Each processing node has as much as 256 MB of DRAM. Each of two DRAM banks is 71 bits wide with 64 data bits and 7 ECC bits. DRAM can be accessed with 64-bit, 32-bit, 16-bit or 8-bit transfers.

When the system is initialized or configured, the DRAM bank size DBS), DRAM row/column configuration (DRC), and DRAM bank enable DBE) bits must be set up in the node configuration (NC) register for each processing node. See the descriptions in the NC register.

Software must write and read DRAM to determine how much DRAM is installed in the node.

Cachable and Non-Cachable DRAM

Each node has cachable and non-cachable DRAM. FFFF FFFF-F000 0000 does cached DRAM accesses. EFFF FFFF-E000 0000 is a non-cachable alias of the cachable address block. The node processor can perform cachable and non-cachable read- and write-accesses to its DRAM. Cachable DRAM includes the node control registers and mailboxes. External DRAM accesses are not cached.

Locked Accesses

A node processor can lock access to its local DRAM by executing a lock instruction. The processor can then execute up to 30 i860 instructions before it must deassert its lock by executing an unlock instruction; a trap is generated if this constraint is violated. The lock gives the processor exclusive access to its resources. This enables a program to perform read-modify-write accesses or read-maybe write accesses, as well as other combinations, control shared resources, such as shared DRAM buffers or semaphore registers.

To release a lock, the node processor must execute an unlock instruction followed by a dummy-read.

An external processor can also lock accesses to a node's DRAM, by performing the above actions and accessing an external-DRAM page. This relays the external processor's lock-pin state across the crossbar network. The crossbar lock-signal then locks access to the local DRAM.

Error Checking and Correction

Error-checking and correction (ECC) logic generates ECC bits during write cycles, and checks for errors during read cycles. The ECC logic checks for one- or two-bit errors, and corrects one-bit errors. When DRAM is written, the ECC logic computes ECC bits and writes them to DRAM with the data. When DRAM is read, the ECC logic compares the ECC bits with the data, and determines whether a DRAM error has occurred.

During a local read, when the ECC logic encounters a correctable one-bit error, it corrects the error, puts the data on the data lines, and then asserts a correctable-error interrupt to the node processor. When the ECC logic encounters a non-correctable two-bit error, it puts the uncorrected data on the data lines and asserts an uncorrectable-error interrupt to the node processor.

During a slave read, ECC corrects one-bit errors, but does not assert a correctable-error interrupt to the master. When the ECC logic encounters a non-correctable two-bit error, it puts the uncorrected data on the data lines and asserts an uncorrectable-error interrupt to the master.

When either an ECC error (correctable or uncorrectable) or a local-bus error occurs, bits 27:13 of the offending address are latched into the node configuration register, as well as a flag which identifies the accessing node as local or remote. This makes it possible to identify which 8 Kbyte page of local DRAM contains the address which caused the error. Since the low 13 bits of the address are not saved, it is not possible to directly identify the specific error-causing address. The latched information is held until all three error interrupts (correctable ECC, uncorrectable ECC and local-bus) are cleared. This means that the latched information describes the first of several possible errors.

If an ECC error was caused by a slave read, the master can read the Configuration Register (NC) of the affected node to get the offending address. The master does not know when a remote correctable ECC error occurs.

If a slave access causes a local-bus error in the slave (such as by addressing an invalid register or DRAM location), the slave's NC register will capture the offending address. In addition, the master receives a remote-bus error interrupt.

The IPC Mailbox

Each processor node has a 4 Kbyte or 32 Kbyte mailbox to receive messages from masters. The address ranges are:

4-Kbyte: FFFF 7FFF-FFFF 7000

32-Kbyte: FFFF 7FFF-FFFF 0000

Each node has a Mailbox Write (MW) register and a Mailbox Counter MC) register. Masters write write data to the mailbox by writing to MW. MC reflects how many 64-bit message long-words presently reside in the node's mailbox area. The high-order bits of the MC register can be used to detect overrun of a node's mailbox area.

The mail routine should maintain a read-pointer into the mailbox.

Writing to a Mailbox

The master can send mailbox data by writing to the slave's MW register. MC automatically increments with each write, and if it reaches the end of the buffer, MC wraps to the beginning.

Mailbox Write (MW) Register FFFF FC00

The Mailbox Write (MW) register writes data from a master to the node's IPC mailbox.

| Bits | Definition |
| --- | --- |
| 64-0 | Mailbox write data |

Before sending messages to a slave node, a master should find out the size of the slave's mailbox buffer to avoid overrunning the mailbox. To obtain this information, read the slave's NC:MBS (bit 1, 1=4 Kbytes, 0=32 Kbytes), then read the slave's MC register to determine how much mailbox space remains. If the mailbox is full, delay sending the message.

Resets clear MC, therefore MW write-pointer points to the first address in the mailbox area (FFFF 7000 for a 4-Kbyte mailbox, or FFFF 0000 for a 32-Kbyte mailbox). Each subsequent write increments the write-pointer by 1.

When a master writes to a slave's MW register, a mailbox interrupt is asserted through the interrupt control register (IC:MBI bit 17). Mailbox interrupts can be enabled or masked via mailbox interrupt enable IC:MBI bit 29. Set to enable, clear to mask.

When the mailbox interrupt is asserted, it remains pending until it has been cleared by the slave. Multiple mailbox interrupts overwrite one another.

A processor can clear its mailbox interrupt by reading or writing the Clear Mailbox Interrupt (CMI)register at FFFF FCE8. This also clears IC:MBI bit 17. See the section, "Clearing Interrupts—Synchronously and Asynchronously".

Mailbox Counter (MC) Register FFFF FC70

MC is a 16-bit register that counts how many messages currently reside in that node's mailbox. Also, MC specifies where the next mailbox item will be written. Each write to MW increments MC by 1. MC can be read either by the slave or by the master. Resets clear MC. Clearing MC clears the mailbox.

| Bit | Mnemonic | R/W | Definition |
| --- | --- | --- | --- |
| 31:20 |  | R/W | Unused |
| 32K |  |  | Mailbox: |
| 19:21 | OVF | R/W | Mailbox overflow |
| 11:0 | MC | R/W | Mailbox count. |
| 4K |  |  | Mailbox: |
| 19:9 | OVF | R/W | Mailbox overflow |
| 8:0 | MC | R/W | Mailbox count. |

Mailbox data is aligned on 64-bit boundaries. MC bits 19:12 for a 32 Kbyte mailbox and bits 19:9 for a 4 Kbyte mailbox should always be 0. If they are not 0, the buffer has been overrun. MC is automatically incremented when MCB is written, but not automatically decremented when the buffer is read; the slave processor must decrement MC.

The MC value can be changed while being read by a slave, giving the slave an incorrect message length. This can happen if a master writes to the slave's mailbox while the slave is reading its MC. To avoid this, the slave should perform a locked read.

Direct Memory Access (DMA)

The DMA controller transfers blocks of data between local memory and external memory. The controller must be able to generate addresses in local memory, define paths to and from a external node, and define addresses within the node's local address-space. In addition, the DMA controller must be capable of maintaining control information, such as requested transfer block-length and current transferred-word count. Finally, the DMA controller must be able to process a sequence of memory resident DMA commands, as well as detect when its tasks are complete.

The node processor creates a linked-list of transfer commands in local memory, and then starts the DMA controller. To monitor the progress of DMA activities, either enable the DMA Interrupt (IC:DMI), or poll the DMA controller for status information.

The DMA controller accesses external DRAM through page 0 and its associated map-register.

Note: A DMA transfer command only needs to specify a return path (from an external resource to the DMA controller's node) if the command calls for a block-read from a "split-read"-capable external resource. See the section titled "Split-Read Accesses" for more information on such transactions.

The DMA controller receives its instructions from a linked-list of DMA-transfer descriptor structures in node DRAM. This mechanism allows a processor to queue multiple DMA requests for the DMA controller, and then to proceed with other activities. The DMA controller sequentially processes each entry in the request-queue, posting progress-status information as it proceeds.

The DMA controller has two registers: DMA Next-Descriptor (DND) and DMA Transfer-Count (DTC).

DMA Next-Descriptor Register (DND) FFFF FC90

The DMA Next-Descriptor register points to the descriptor for the next DMA operation to be performed; DND points to one of the elements in a linked-list of DMA descriptors.

Following power-up, the DND register is initialized to zero.

The master can write to DND to direct the DMA controller to process a particular DMA descriptor. A processor can also obtain DMA processing-status information by reading DND.

| Bit | Mnemonic | R/W | Definition |
|---|---|---|---|
| 31-28 | | | Not used - read as 0 27:3 |
| DAD | | | Descriptor address |
| 2 | GO | | DMA go. |
| 1:0 | | | Not used - read as. |

If the DMA controller is halted, and if the DND register is written with the address of a descriptor and an active go-bit (set to 1), the DMA controller immediately begins processing the descriptor pointed to by the DND.

If the node processor (or an external processor) writes a new descriptor-address and an active go-bit to the DND while the DMA controller is active, then the DMA controller will process the DND-indicated descriptor after it finishes its current activities (if any). This is how the processor initiates DMA operations. It also provides a mechanism for changing the DMA command-stream.

If a write to DND initiates or alters DMA operations, ensure that the descriptor pointed to by DND is part of a normally-terminated descriptor-chain. GO Setting DND:GO starts a DMA transfer; clearing DND:GO does not halt a DMA transfer.

Writing a new descriptor address and an inactive go-bit to the DND register has no effect on the DMA controller, which is normally controlled by the link-word of a memory-resident descriptor. In fact, if the DMA controller is active while such a DND register-write occurs, the DMA controller will over-write the newly-written address when the controller completes its transfer and posts its status to the DND register.

An active go-bit in the DND register is directly presented to the DMA controller; the controller does NOT need to poll the DND register to determine when a new DMA request has been written to the register. Thus, there is no access contention for this register. Similarly, when the DMA controller is ready to begin processing the next descriptor in the memory-resident descriptor chain, the controller reads the entire descriptor from memory. This avoids memory-access conflicts with the processor.

| DMA Block Count Register (DBC) | FFFF FCA0 |
|---|---|

A node's DMA Block Count (DBC) register is a 32-bit counter which is incremented by the DMA controller after the controller finishes processing a DMA descriptor. The DBC register is incremented by one after each entire DMA transfer is completed (NOT after each data item is transferred).

The node processor can read DBC register to determine how many descriptors have been completely processed by the DMA controller.

Following power-up, this register is initialized to zero.

Dynamic DMA Registers

A processing node contains several registers maintained by the node's DMA controller as it transfers data. The following registers are only available for use by diagnostic routines:

| DMA Dynamic Word-Count Register (DWC) | FFFF FC80 |
|---|---|

DWC contains the current DMA transfer word count. The node maintains DWC as it transfers data. DWC is available only to diagnostic routines.

| DMA Dynamic Local-Address Register (DLA) | FFFF FC88 |
|---|---|

DLA contains the local address of the current DMA transfer. The node maintains DLA as it transfers data. DLA is available only to diagnostic routines.

| DMA Dynamic Remote-Address Register (DRA) | FFFF FC9C |
|---|---|

DRA contains the external address of the current DMA transfer. The node maintains DRA as it transfers data. DRA is available only to diagnostic routines.

Transfer-Descriptor Chain

The DMA controller operates under the direction of a linked-list of "transfer-descriptor" data structures. This linked-list resides in node DRAM; normally, it is built by local node processor. However, external devices can also build such a list in local memory. Each descriptor contains a pointer to the descriptor for the next command to be executed, or an end-of-command-chain indicator.

Each DMA descriptor contains 6 32-bit words. All descriptors must begin on an 8-byte boundary. In addition, the contents of a given descriptor cannot straddle a 2-Kbyte DRAM page boundary. (Note that this is a 2-Kbyte DRAM page, not an 8-Kbyte external-memory page). Different descriptors within a descriptor-chain can, however, reside in different 2-Kbyte DRAM pages.

The contents of a DMA descriptor are as follows:

| Byte-Offset | Field Name | Field Description |
|---|---|---|
| 0 | Transfer-count | 2's COMPLEMENT of the number of 64-bit words to transfer |
| 4 | External route | External routing word establishes a path to an external node |
| 8 | Local address | Local-DRAM starting address of source of destination |
| 12 | Return route | Return routing word establishes a path from the external node back to this node (for split-reads only) |
| 16 | Link | Address of next descriptor and start-flag, or address of current descriptor and stop-flag |
| 20 | Remote address | Starting address of remote-node source or destination, including transfer direction and interrupt-request flags |

Transfer-Count

The transfer-count is the 2's complement of the number of 64-BIT words to be transferred. This allows the DMA logic to increment the count-value until it reaches 0, indicating that the transfer is complete. The DMA controller transfers only 64-bit long-words; shorter-length data must be grouped into 64-bit long-words for transfer, or they can be transferred by the node processor.

Since the transfer-count is a full 32-bit (signed) quantity, the block-length can be made large enough to move the entire 256-MByte local DRAM in one DMA transfer.

External-Route

The external route defines the communication route through the crossbars. Also see the External Routing register description earlier in this document.

Local-Address

The local address is a 28-bit quantity, specified in a 32-bit word. This allows the DMA controller to access any location in the node's DRAM. Only bits 27:3 of the address are used.

Return-Route

The return route defines the data path used by a split-read slave when sending data to the requester. Also see the Return Routing register description earlier in this document.

Link

The 32-bit DMA-descriptor link word contains the address of the next DMA descriptor to be processed. Bits 27:3 specify the descriptor's starting-address in local DRAM; bits 1:0 are not used.

| Bit | Mnemonic | R/W | Definition |
|---|---|---|---|
| 31:28 | | | not used — must be 0000 |
| 27:3 | LA | | Local address bits 27:3 |
| 2 | GO | | Go |
| 1:0 | | | not used — must be 00 |

GO

GO enables the DMA controller to process the descriptor. If GO=1, the DMA controller processes the descriptor. If GO=0, the DMA controller stops performing DMA transfers. To resume DMA operations, set GO.

A special convention is used to delineate the last descriptor in a linked-list of descriptors. First, the last descriptor's link-address is set to point back to the last descriptor. In addition, the last descriptor's go-bit is cleared. When the DMA controller finishes processing a descriptor and then encounters a cleared go-bit in the link-word of that descriptor, the controller halts.

External Address

The external address gives the DMA controller access to slave address space:

| Bit | Mnemonic | R/W | Definition |
|---|---|---|---|
| 31:28 | | | not used — must be 0000 |
| 27:3 | EA | | External address bits 27:3 |
| 2 | FD | | Fast DMA (DMA flow-control mode flag). |
| 1 | IR | | Interrupt-request |
| 0 | TD | | Transfer direction |

Bits 2:0 are provided by the Crossbar logic. The DMA controller has a 128-byte data buffer. The external-address word contains a "Fast DMA" flag (bit 2) which selects the operating mode for this data buffer.

1=the DMA buffer is filled as soon as there is any room in the buffer.

In this mode, data moves into the buffer at the same rate that it moves out. Thus, if the slave is as fast as the DMA controller, data moves between the two nodes as a single burst.

Fast DMA (FD)

If FD=0 (fast DMA), the DMA logic does not request use of the node's local bus until the buffer is half-full.

If FD=1 (Slow DMA), the DMA buffer is used differently for reads than for writes. If the DMA controller is reading from a slave, the DMA logic will accumulate 4 64-bit long-words of read-data in the DMA buffer before it transfers this data to local DRAM. If the DMA controller is writing to a slave, the DMA logic will start a read from local DRAM when the DMA buffer has room for 8 64-bit long-words.

Interrupt-request (IR)

If IR=1, the DMA logic issues a "DMA transfer complete" (DTC) interrupt to the node processor after completing the current DMA transfer. This allows the processor to initiate a DMA operation and then to engage in other processing until the requested transfer is completed. An interrupt can be generated following each of a series of transfers, or following particular transfers, or following completion of an entire series of transfers.

Transfer direction (TD)

If TD=1, the DMA controller transfers data from a slave to DRAM. If TD=0, the DMA controller transfers data from DRAM to the slave.

Adding a Descriptor to a Chain

A node processor can add a new DMA descriptor to an existing linked-list of descriptors. Normally, a new descriptor is appended at the end of the existing chain; however, a descriptor can also be "spliced" into a point within the chain. In that case, the new descriptor can simply be interleaved with the existing descriptors, or it can be used to direct subsequent DMA processing to a different chain of descriptors. The contents of the new descriptor's link-word determine which of these possibilities occurs in a given situation.

Assume that a descriptor is to be added at the end of an existing linked-list of descriptors. The addition requires four or five separate steps:

1) The new descriptor must be created in local memory, abiding by the descriptor alignment and page-boundary constraints.
2) The new descriptor's link-word address must be set to point to the beginning of the new descriptor. That link-word's go-bit must be cleared (indicating end-of-chain).
3) The address in the link-word of the current last descriptor in the chain must be set to point to the beginning of the descriptor to be added. The go-bit of the patched descriptor's link-word must be set (active).

4) After step 3, the node processor must read the node's DMA Next-Descriptor (DND) register. If the DND value is not equal to the address of the descriptor patched in step 3, then the DMA controller has not yet processed the patched descriptor. In that case, the descriptor addition is complete.

5) If the DND value is equal to the address of the descriptor patched in step 3, this indicates that the DMA controller has processed the patched descriptor and has read its inactive go-bit (previous end-of-chain indication) before addition of the new descriptor was completed. In this case, the processor must write the address of the newly-added descriptor to the node's DND register, together with an active go-bit. This causes the DMA controller to begin processing the new descriptor.

When the processor creates the first descriptor in a chain, a "dummy" descriptor must be allocated; then, the dummy-descriptor's link-word can be set to point to the first real descriptor. With this approach, the descriptor-adding procedure works the same for the first descriptor as for subsequently added descriptors.

Timers

The processing node has two programmable timers, each of which can generate periodic interrupts to the node processor. In addition, each node contains a free-running Time-Stamp register which can be used to determine the length of time between two events. The timers are configured as follows:

The timers use a 10 MHz clock (100 ns). You must program the Oscillator Divide-Down Ratio (ODR), Bit 10 of the NC register to derive this clock from the system clock.

The timer registers are:

| Register | Address | R/W | Action |
| --- | --- | --- | --- |
| Timer-1 Interval (T1I) | FFFF FC40 | W | Write: load interval |
| Timer-1 Counter (T1C) | FFFF FC48 | R/W | Write: load Counter 1 from T1I |
| | | | Read: get current Counter-1 value |
| Clear Timer-1 Interrupt (CT1I) | FFFF FCF0 | R/W | Write: asynchronously clear interrupt |
| | | | Read: synchronously clear interrupt |
| Timer-2 Interval (T2I) | FFFF FC50 | W | Write: load interval |
| Timer-2 Counter (T2C) | FFFF FC58 | R/W | Write: load Counter 1 from T2I |
| | | | Read: get current Counter-2 value |
| Clear Timer-2 Interrupt (CT2I) | FFFF FCF8 | R/W | Write: asynchronously clear interrupt |
| | | | Read: synchronously clear interrupt |
| Time-Stamp (TS) | FFFF FC60 | R/W | Write: initialize count-up value |
| | | | Read: get current TS value |

Following reset, all timer registers are cleared.

Timer Interval Registers (TnI)

Timer 1 and Timer 2 are 32-bit general-purpose timers. Timer-1 and Timer-2 registers are identical. Write to the TnI registers to load a count-down period.

Timer Counter Registers (TnC)

The Timer Counter registers (TnC) are dual purpose: writes load the Counter register from the Interval register; reads return the current value of the counter.

| | |
| --- | --- |
| Time Stamp Register (TS) | FFFF FC60 |

TS is written and read by local and external processors. Typically, TS is only read, and is used to measure elapsed time. TS wraps around every $(2^{**}32) * (0.10\ \text{microseconds})$, or about every 7 minutes.

TS begins counting up immediately after it is cleared.

Using the Timer Registers

Write to the TnI registers to load a count-down period. To start counting down, write to the Timer Counter (TnC) register. This transfers the contents of the Interval register into the Counter register, and enables the count-down.

When the counter reaches zero, two things happen: the processor's Timer (1 or 2) interrupt is asserted, and the counter is automatically reloaded from the Interval register. This prepares the counter for the next count-down.

Timer 1 and Timer 2 each drive an interrupt-source; when a count reaches zero, an interrupt is asserted. To clear a timer interrupt, read (synchronous clear) or write (asynchronous clear) the corresponding clear timer register.

The processor can read the Counter register to obtain the current count; however, since the counter cannot be disabled, the processor cannot indirectly read back the Interval value by loading the counter from the Interval register, and then reading the counter.

A Counter register can be set to count down from a value much shorter than 32 bits Thus it is possible for a counter to decrement past 0 more than once while a timer interrupt is being serviced. Use the Time-stamp register to detect this.

By reading the TS upon entry to the timer interrupt service routine (ISR), and by comparing that value to a TS value stored on entry to the previous Timer ISR call, it is possible to determine the length of time since the previous time-stamp was taken. By dividing that interval by the current Counter-register count-down interval, one can calculate how many times the counter has wrapped around since the previous time-stamp.

Performance Metering

Performance metering non-intrusively captures system performance information to help a user analyze how a program utilizes system resources. Each node can be programmed to monitor the performance of:

node DRAM node crossbar-port usage node processor activity.

Each node can monitor a different set of performance data. However, the internal performance of the crossbar network cannot be directly monitored. For example, when crossbar auto-routing is used, the routing frequencies along different paths between two end-points cannot be measured.

Instead, each node can obtain information about how that node's local crossbar ports are used (such as port-contention data), information about path-establishment latency, and information about path utilization (such as effective transfer-rate).

A processing node has two performance-metering registers: Performance-Monitor Mode (PMM) and Performance-Monitor Counter (PMC). PMM specifies which performance conditions are to be monitored; one or more conditions can be studied. PMC records how many of the selected event occurred during a metering period.

The performance-metering registers can be used in conjunction with the node timer registers. In particular, the node Time-Stamp register can be used to determine the length of time during which events are recorded. This allows a user to calculate event counts per unit time, and to gather average performance figures over some period.

| Performance-Monitor Mode (PMM) Register | FFFF FC30 |
|---|---|

The Performance-Monitor Mode (PMM) register is a 32-bit register which resides at local address FFFF FC30. The PMM register can be programmed with a code which identifies what type of event is to be counted. The following table lists the supported event-type codes, grouped by event category:

| PMM Value | Event |
|---|---|
| | Count accesses to local memory: (1 count per DRAM CAS pulse). |
| 0x0000 0000 | with local processor as master |
| 0x0000 0001 | with local DMA as master |
| 0x0000 0002 | with external master |
| 0x0000 0003 | with any local-memory accesses |
| 0x0000 0020 | with local-processor instruction-cache fills |
| | Count non-D64 accesses to local memory: |
| 0x0000 0010 | with local processor as master |
| 0x0000 0012 | with external master |
| 0x0000 0013 | all non-D64 local-memory accesses |
| | Count accesses to new DRAM rows. (There can be many accesses within a given row). |
| 0x0000 0030 | Local-processor DRAM-row starts |
| 0x0000 0031 | Local-DMA DRAM-row starts |
| 0x0000 0032 | External-master DRAM-row starts |
| 0x0000 0033 | all DRAM-row starts |
| | Freeze the performance counter: |
| 0x0000 0040 | Do not count |
| | Codes to count 20-MHz local-bus clock cycles: 0x0000 0070 with local processor as master |
| 0x0000 0071 | with local DMA as master |
| 0x0000 0072 | with external master |
| 0x0000 0073 | all 20-MHZ clock-cycles |
| | Monitor crossbar (Xbar) performance: |
| 0x0000 0100 | Local master Crossbar requests killed by external master Crossbar requests |
| 0x0000 0101 | Local-DMA Crossbar requests killed by external master Crossbar requests |
| 0x0000 0103 | Any killed Crossbar requests |
| 0x0000 0110 | Idle Crossbar cycles with local processor as master |
| 0x0000 0111 | Idle Crossbar cycles with local DMA as master |
| 0x0000 0113 | Idle Crossbar cycles with local processor or local DMA as master |
| 0x0000 0120 | Crossbar cycles with local processor Crossbar-access request but no local-processor Crossbar transfers |
| 0x0000 0121 | Crossbar cycles with local DMA Crossbar-access request but no local-DMA Crossbar transfers |
| 0x0000 0123 | Crossbar cycles with local-processor or local-DMA Crossbar-access request but no local-processor or local-DMA Crossbar transfers |
| 0x0000 0130 | Local-processor Crossbar requests not killed |
| 0x0000 0131 | Local-DMA Crossbar requests not killed |
| 0x0000 0133 | Local-processor or local-DMA Crossbar requests not killed |
| 0x0000 0140 | Total local-processor Crossbar requests |
| 0x0000 0141 | Total local-DMA Crossbar requests |
| 0x0000 0143 | Total local-processor or local-DMA Crossbar requests |
| 0x0000 0150 | Total local-processor-driven Crossbar transfers |
| 0x0000 0151 | Total local-DMA-driven Crossbar transfers |
| 0x0000 0153 | Total local-processor-driven or local-DMA-driven Crossbar transfers |
| 0x0000 0160 | 20-MHz cycles with local processor waiting to receive split-read data |
| 0x0000 0161 | 20-MHz cycles with local DMA waiting to receive split-read data |
| 0x0000 0163 | 20-MHz cycles with local processor or local DMA waiting to receive split-read data Codes for miscellaneous conditions |
| 0x0000 0200 | 20-MHZ cycles with interrupt to local processor pending |
| 0x0000 0210 | Local-processor accesses to DRAM stalled by other DRAM accesses |
| 0x0000 0220 | Local-processor accesses to Crossbar stalled by other Crossbar accesses |
| 0x0000 0230 | Local-processor accesses to DRAM stalled by external |

-continued

| PMM Value | Event |
|---|---|
| | master accesses to DRAM |
| 0x0000 0240 | Local-processor stalls while accessing either local or external memory |
| 0x0000 0250 | 20-MHz cycles with local DRAM idle but accessible |

| Performance-Monitor Counter (PMC) Register | FFFF FC38 |
|---|---|

Each processing node has a 32-bit Performance-Monitor Counter (PMC) register that counts events.

Once a monitor event-type code has been written to the Performance-Monitor Mode register, the performance-metering logic increments PMC by one for every occurrence of the event.

PMC can be read and written by both local and external masters. This allows a processor to load the PMC register with an initial count, such as 0.

Before loading a value into PMC, stop PMC by writing 0x0000 0040 (do not count) to it.

Some events increment PMC twice, due to the use of two distinct 20-MHz clocks in implementing the performance-metering logic Using The Performance-Metering Facility Clear PMC by writing 0 to it.

To do cumulative counts, load PMC with a previous count. The metering routine then writes an event-type code to the PMM register, to select what type of event is to be counted. This immediately enables the PMC register for counting. The metering routine should then immediately pass control to the monitored code (to avoid possibly corrupting a metering interval measurement by counting spurious ticks from unrelated system events).

At the end of the code to be monitored, execution is passed back to the metering routine. If the monitored code is to be monitored for some fixed period of time, the metering routine can use one of the two node timers to produce a local-processor interrupt at the end of the metering period. The timer-interrupt service routine can then pass control back to the metering routine.

When control returns to the metering routine, that routine stops the PMC register (by writing 0x0000 0040 to the PMM register). The metering routine reads the PMC register to obtain the number of events of interest which occurred during the metering period.

The node timers are normally used in conjunction with the performance-metering registers. The timer resources can be used to measure the length of time between two events, or to count events for a predetermined period.

For example, measuring the length of time between two events might be used to count the number of local-processor crossbar-port requests which occur between external-processor crossbar accesses. To make this type of performance measurement, a performance-metering routine can read the node Time-Stamp register before and immediately after execution of a code-segment of interest. The difference between the ending-value and starting-value of the Time-Stamp register establishes the duration of the metering period.

Booting From Local EEPROM

To support self-booting processor nodes, the i860 processor has a CS8 instruction access mode. In the CS8 mode, upon exiting a reset trap, the i860 fetches instructions through byte-wide processor bytelane 0 (rather than fetching 64-bit-wide instructions).

The following events will reset and boot a node:
System power-up.

VME bus reset.

Processor board reset by an external VME master.

If CS8 mode is selected, the node fetches instructions from the motherboard-resident EEPROM, one byte at a time. Instruction-fetching begins as soon as reset is released.

In contrast, if the external interrupt pin calls for normal instruction-fetch mode, the node processor will not start to fetch instructions until it is remotely enabled to do so. (See NC:RSC).

Upon exiting a reset trap, the i860 always begins execution at FFFF FF00. In CS8 mode, the top of EEPROM is mapped to that restart-vector address.

If the node is reset by an external master and the node is not configured to boot in CS8 mode, the external master must down-load code to the slave DRAM, then set the node's NC:RSC bit.

If the processing node is configured to boot in CS8 mode, the node processor should set NC:CS8 and NC:RSC to reflect the execution state. When it is done executing the byte-wide EEPROM, the node processor must clear the CS8 bit in its internal DIRBASE register, then the processor must set its NC:RSC and clear NC:CS8.

The following guidelines must be followed in order to ensure a successful transition to normal 64 bit instruction-fetching:

The boot-strap instructions must be addressed in the cached address-space, so that they are copied into the processor cannot be allowed to execute these instructions until the cache-line which contains them has been loaded.

The write to NC must be flushed out of the cache and into the external Configuration register. This can be done by following the write with an uncached read from memory, or from a node register.

Other details of a preferred embodiment of the system of the invention may be found in the VHDL listings for a crossbar ASIC and a computer node (or computing environment) ASIC, both accompanying U.S. Pat. No. 5,598,568 as Appendix A.

I claim:

1. In a multicomputer having at least:
   (a) a plurality of processing nodes, each having memory means for storing memory address-accessible digital signals,
   (b) at least one of said processing nodes having processing means for generating access requests for access to a digital signal stored in at least one of said memory means, and
   (c) at least one crossbar, having a plurality of ports, each said port coupled to a processing node or a port of another crossbar, for transfer of digital signals therebetween the improvement wherein:
   at least one of said processing nodes includes crossbar interface means coupled to a port of said crossbar,
   said crossbar interface means including message means responsive to selected access requests from the associated processing means for generating a message header, based on said access requests, comprising a routing signal representative of a succession of crossbar ports, and for transmitting said message header to the crossbar port to which
      said crossbar interface means is coupled, said crossbar having crossbar logic circuit means comprising decoding means responsive to said message header for establishing an internal path through said crossbar.

2. A scalable multicomputer comprising
   (a) a plurality of processing nodes, each having memory means for storing memory address-accessible digital signals, each of said processing nodes having associated processing means for executing a memory access instruction for generating an access request for access to a digital signal stored in at least one of said memory means, the access request including a memory address associated with that digital signal,
   (b) at least one processing node including
      mapping means for mapping selected addresses contained in access requests generated by the associated processing means to addresses in the memory means of that processing nodes and for mapping other selected addresses contained in access requests generated by the associated processing means to addresses in the memory means of another processing node, whereby each processing node can directly access the memory means of another processing node by executing memory access instructions of the type that it uses to access its own memory means,
      a crossbar interface, coupled to a port of a scalable crossbar, said crossbar interface including routing means responsive to selected access requests including those other selected addresses for generating a routing signal representative of a succession of crossbar ports between the associated processing node and a processing node where the requested digital signal is stored, and for transmitting said routing signal to the crossbar port to which said crossbar interface is coupled,
   (c) the scalable crossbar for transferring a request and any digital signals accessed thereby between the processing node that generated the request and the processing node where the digital signal is stored, the scalable crossbar comprising a plurality of crossbar elements, each crossbar element having
      a plurality of ports (i) at least one of which is coupled to a port of another crossbar element, (ii) another of which is coupled to any of a port of another crossbar element and a crossbar interface of a processing node,
      decoding means responsive to said routing signal for establishing an internal path through the crossbar element for routing the request and any digital signals accessed thereby between selected ports thereof,
   (d) said routing means including means for generating a routing signal including a broadcast signal designating a broadcast mode of communication, and
      at least one of said crossbar elements including means responsive to said broadcast signal for establishing multiple communications paths therethrough.

3. A scalable multicomputer comprising
   (a) a plurality of processing nodes, each having memory means for storing memory address-accessible digital signals, each of said processing nodes having associated processing means for executing a memory access instruction for generating an access request for access to a digital signal stored in at least one of said memory means, the access request including a memory address associated with that digital signal,
   (b) at least one processing node including
      mapping means for mapping selected addresses contained in access requests generated by the associated processing means to addresses in the memory means of that processing nodes and for mapping other selected addresses contained in access requests generated by the associated processing means to addresses in the memory means of another processing node, whereby each processing node can directly access the memory means of another processing node by executing memory access instructions of the type that it uses to access its own memory means, a crossbar interface, coupled to a port of a scalable crossbar, said crossbar interface including routing means responsive to selected access requests including those other selected addresses for generating a routing signal representative of a succession of crossbar ports between the associated processing node and a processing node where the requested digital signal is stored, and for transmitting said routing signal to the crossbar port to which said crossbar interface is coupled, (c) the scalable crossbar for transferring a request and any digital signals accessed thereby between the processing node that generated the request and the processing node where the digital signal is stored, the scalable crossbar comprising a plurality of crossbar elements, each crossbar element having a plurality of ports (i) at least one of which is coupled to a port of another crossbar element, (ii) another of which is coupled to any of a port of another crossbar element and a crossbar interface of a processing node, decoding means responsive to said routing signal for establishing an internal path through the crossbar element for routing the request and any digital signals accessed thereby between selected ports thereof, (d) said routing means including means for generating a routing signal that includes a priority signal designating a relative priority thereof, and at least one of said crossbar elements including means responsive to said priority signal for establishing and disestablishing internal paths therethrough in accord with said priority signal.

4. A scalable multicomputer according to any of claims 2 and 3, the wherein said crossbar logic circuit decoding means includes means responsive to a fixed relative position in said routing signal at a first crossbar port for coupling said first crossbar port to at least a second crossbar port in the same crossbar.

5. A scalable multicomputer according to claim 4, wherein said crossbar logic circuit includes means for routing said routing signal from said second port to a processing node or crossbar port to which said second port is connected.

6. A scalable multicomputer according to claim 5, wherein said means for routing modifies said routing signal by moving the next successive signal therein to said fixed relative position.

7. A scalable multicomputer according to any of claims 2 and 3, wherein at least selected ones of the crossbar elements includes means for providing alternate internal paths through said element in response to said routing signal.

8. A scalable multicomputer according to any of claims 2 and 3, wherein at least a selected processing node comprises DMA controller means for initiating the transfer of blocks of digital signals over a routing path between the memory means of the selected processing node and the memory means of another processing node.

9. A scalable multicomputer according to any of claims 2 and 3, comprising a slave processing node in which a requested digital signal is stored includes means for signalling a split-read transaction and for, later, transmitting that digital signal over the crossbar to at least a selected processing node, at least a selected processing node includes means responsive to signalling of a split-read transaction for suspending execution of its associated processing means, and for restoring normal execution of that processing means on receipt of the requested digital signal from the slave processing node.

10. In a multicomputer according to claim 9, the further improvement wherein the selected processing node includes means for transmitting to the slave processing node a return route address identifying at least one of (i) a succession of crossbar nodes between the slave processing node and the selected processing node, and (ii) an address in the memory of the selected processing node where the requested digital signal is to be stored.

11. A sable multicomputer according to any of claims 2 and 3, wherein at least a selected processing node comprising DMA controller means for transferring blocks of digital signals over a routing path between the memory means of the selected processing node and the memory means of another processing node, said DMA controller means comprising means for maintaining control information, including requested transfer block-length and current transferred-word count, pertaining to the transfer of the blocks of digital signals, said DMA controller further including means for processing a sequence of memory resident commands for controlling the transfer of the blocks of digital signals.

\* \* \* \* \*